United States Patent [19]

Devino

[11] Patent Number: 4,598,292
[45] Date of Patent: Jul. 1, 1986

[54] ELECTRONIC STANDBY FLIGHT INSTRUMENT

[75] Inventor: Vincent A. Devino, Hauppauge, N.Y.

[73] Assignee: Grumman Aerospace Corporation, Bethpage, N.Y.

[21] Appl. No.: 564,728

[22] Filed: Dec. 23, 1983

[51] Int. Cl.4 .................. G01C 21/00; G01C 23/00
[52] U.S. Cl. .................. 340/973; 73/178 R; 244/1 R; 340/971; 340/975; 364/433
[58] Field of Search .......... 364/434, 424, 433; 73/178 R, 178 T; 340/973-975, 870.13, 945, 971, 977-979; 320/32; 244/1 R

[56] References Cited

U.S. PATENT DOCUMENTS

| | | | |
|---|---|---|---|
| 2,435,063 | 1/1948 | Weaver | 320/32 |
| 3,112,644 | 12/1963 | Schroeder | 73/178 |
| 3,206,974 | 9/1965 | Andresen | 73/178 |
| 3,520,994 | 7/1970 | McAfee et al. | 340/973 |
| 3,651,691 | 3/1972 | Pliha | 73/178 R |
| 4,155,116 | 5/1979 | Tawfik et al. | 364/424 |
| 4,163,387 | 8/1979 | Schroeder | 340/973 |
| 4,283,705 | 8/1981 | James et al. | 73/178 R |
| 4,301,398 | 11/1981 | Johnson | 320/39 |
| 4,326,189 | 4/1982 | Crane | 340/973 |
| 4,340,936 | 7/1982 | Mounce | 364/443 |
| 4,371,870 | 2/1983 | Biferno | 340/716 |
| 4,444,053 | 4/1984 | Rider | 73/178 R |
| 4,463,355 | 7/1984 | Schultz et al. | 340/971 |
| 4,484,189 | 11/1984 | Dettmer | 340/974 |
| 4,520,669 | 6/1985 | Rider | 73/178 R |

Primary Examiner—John W. Caldwell, Sr.
Assistant Examiner—Brent A. Swarthout
Attorney, Agent, or Firm—Richard G. Geib; Daniel Jay Tick; Bernard S. Hoffman

[57] ABSTRACT

A self-contained, standby flight instrument includes sensors, processing circuitry, rechargeable power supply, voltage regulation circuitry, and display hardware arranged to provide a continuous display of aircraft airspeed, altitude, roll, pitch and heading regardless of any partial or complete failure in the primary instrumentation, an interrelated subsystem, or the electric power supply.

4 Claims, 1 Drawing Figure

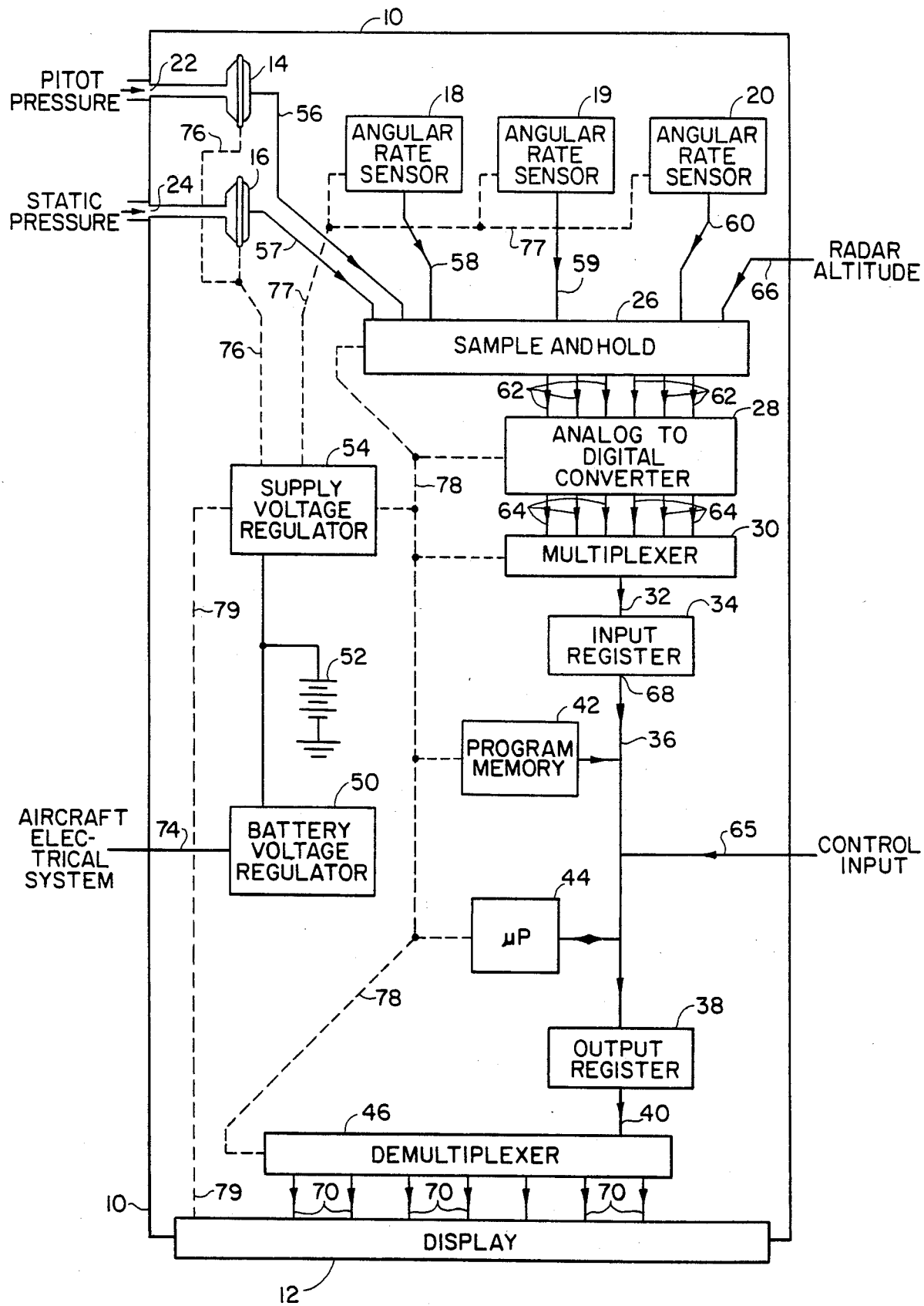

ELECTRONIC STANDBY FLIGHT INSTRUMENT

BACKGROUND

The present invention relates to flight instruments in general, and particularly to standby flight instruments which display essential navigation information in the event of a primary system failure.

The increasing complexity of both commercial and military aircraft systems has been paralleled by multiplication of flight instruments and cockpit displays. In large aircraft especially, navigational information from radar sensors, gyroscopic sensors, etc. frequently undergoes substantial processing before reaching the cockpit display. Furthermore, the interrelation of various aircraft information processing, power supply, and other electrical subsystems increases the likelihood that a failure in one subsystem could leave a pilot deprived of essential airplane attitude and navigational information. A crucial failure in a flight computer could conceivably disable the entire cockpit display.

The prior art is replete with aircraft displays emphasizing various advantages. U.S. Pat. Nos. 3,112,644 and 3,206,974, issued to E. H. Schroeder and Andresen respectively, disclose integrated flight instrument systems having error correcting capabilities based on duplicate pilot/copilot instrumentation. U.S. Pat. Nos. 4,163,387 and 4,340,936, issued to R. L. Schroeder and Mounce, respectively, show microprocessor driven displays for systems of remote sensors. U.S. Pat. No. 4,283,705, issued to James et al teaches the combination on a single display of all necessary flight parameters for controlling flight path during enroute navigation and final instrument approach.

None of the aforementioned systems, however, addresses the problem of instrument loss in the event of a total or partial electric power failure, a communication break to a sensor remote from the display, or a malfunction in the flight computer or other intermediary display processing equipment.

SUMMARY OF THE PRESENT INVENTION

It is therefore a principal object of the present invention to provide a standby flight instrument to display essential flight attitude and navigation parameters in the event of a failure in the primary display.

Another object is to provide such an instrument which employs no remote sensors.

Yet a further object of this invention is the provision of such an instrument which will operate for an extended period in the event of a power failure.

The above and other objects and advantages are realized in brief by enclosing sensors, processing circuitry, and a power supply in a single instrument housing mounted within view of the pilot. A display on the housing outputs aircraft airspeed, altitude, pitch, roll, yaw and heading. The only necessary connections for standby operation are air conduits to pitot tube and static pressure source.

A voltage regulator in the enclosed power supply means serves to charge the standby battery from the aircraft electrical system. Optional inputs allow the pilot to control scales on the display and to select radar (externally derived) or barometric altitude readings.

BRIEF DESCRIPTION OF DRAWING

A better understanding of the present invention may be had by reference to the appended drawing, in which the FIGURE shows a block diagram of a preferred embodiment.

DETAILED DESCRIPTION OF PREFERRED EMBODIMENTS

Referring to the FIGURE, a schematic block diagram illustrates a preferred embodiment of the present invention. As shown, housing 10 serves to enclose sensor means, processor means, and power supply means, while a display 12 is mounted on housing 10 so as to be visible to the pilot. Housing 10, in turn, is rigidly mounted to the aircraft, i.e., in a fixed position relative to the airframe.

Included in the sensor means are pressure transducers 14 and 16 and angular rate sensors 18-20. As indicated, transducers 14 and 16 are connected, respectively, to vents 22 and 24 through housing 10. In turn, vent 22 is connected to a pitot tube to provide pitot pressure to a diaphragm or other pressure sensitive mechanism in transducer 14; and vent 24 is similarly connected to a static pressure source, i.e., an unpressurized volume of static air within the aircraft. Sensors 18-20 are rigidly mounted within the housing in a non-planar orientation.

Processing means enclosed within housing 10 includes sample-and-hold circuit 26 responsive to the sensor outputs, analog-to-digital (A/D) converter 28 responsive to sample-and-hold 26, multiplexer 30 responsive to A/D 28 and outputting to an input bus 32, an input register 34 responsive to bus 32 and outputting to a program bus 36, an output register 38 responsive to bus 36 and outputting to an output bus 40, a program memory 42 communicating with a microprocessor 44 by means of program bus 36, and a demultiplexer 46 responsive to output bus 40.

Display 12 may be an LCD (Liquid Crystal Display) device mounted on housing 10 so as to be visible to the pilot of the aircraft. The face of display 12 is laid out in a desired format for readability, such that display 12 can continuously output appropriately routed display signals from demultiplexer 46.

Power supply means enclosed in housing 10 includes a battery voltage regulator 50, a standby battery 52 charged by regulator 50, and a supply voltage regulator 54 for supplying electric power to the various sensor, processor and display components at appropriate voltages.

In operation, the sensor components within housing 10 continuously generate analog electrical signals 56-60 indicative of pitot pressure, static pressure, and angular displacement rates of the aircraft respectively. No electric signals external to housing 10 are involved in the generation of the sensor signals, though, as noted above, pitot pressure signal 56 and static pressure signal 57 require appropriate air pressure communication to vents 22 and 24. The angular displacement rate signals 58-60 output by rate sensors 18-20 need not indicate aircraft rotation about orthogonal axes—; so long as the sensor axes do not all lie in a single geometric plane, the aircraft pitch, roll and heading may be computed at any given time by continuously monitoring and transposing the skewed sensor signals.

Preferably, each of the analog signals 56-60 is periodically sampled at a sufficient sampling frequency to allow display 12 to accurately track the aircraft roll, pitch, heading, altitude and airspeed. Each of the sampled outputs 62 corresponds to an input to sample-and-hold 26, and the sampled sensor signals 62 are, in turn, digitized by A/D 28. During each sample period, the digitized sensor samples 64 are applied, in accordance with a predetermined input sequence, to input bus 32 by multiplexer 30. Each digitized sample, then, is loaded into input register 34 for availability on program bus 36.

As will be readily appreciated by those skilled in the art, program memory 42 and microprocessor 44 are arranged to update display outputs in register 38 with reference to the current values of the digitized sensor signals in register 34. Thus, an algorithm in program memory 42 must account for reading samples from register 34, identifying the samples according to the predetermined input sequence, computing the updated display outputs, and loading the updated display outputs into register 38 in a predetermined output sequence.

Although it may not be necessary to perform all of the processor updating tasks in every sample period—if, for instance, it were necessary to update the aircraft heading only half as frequently as the other display outputs, i.e., in every other sample period, it is anticipated that a single sample period algorithm would simplify implementation of the present invention. One advantage of using a single sample period algorithm is that clocking of all processor components such as, for example, sample-and-hold 26, A/D 28, etc., could be controlled by the microprocessor with one program loop.

The actual numerical calculations for updating the display outputs are straightforward. Those skilled in the art, then, will understand how aircraft airspeed may be derived from pitot pressure, and how static pressure is related to aircraft altitude. The derivation of roll, pitch, and heading outputs from signals 58–60 will depend on the relative axial orientations of sensors 18–20 with respect to the aircraft. Since, as is known in the art, angular rate sensors employing gyroscopic mechanisms must be corrected to account for precession of the gyroscopic element, a preferred embodiment of the present invention incorporates a control input 65 to allow calibration of the aircraft heading by the pilot, prior to take-off or, in flight with reference to a magnetic compass. Alternatively (or additionally), a compass may be incorporated in the sensor means, and a redundant sensor input therefrom used by the processor means to automatically correct the heading on the periodic basis.

Another desirable feature of a system embodying the present invention is the incorporation of a redundant input 66 indicative of aircraft altitude, preferably from an external radar altimeter. Failure of all external avionics of course, would result in the loss of input 66, but since radar altitude is more accurate than barometric altitude, its availability to the standby instrument, in the event of a partial equipment failure, would be advantageous. Control input 65 may thus include, in addition to heading initialization, an indication of the pilot's selection of radar or barometric altitude to be displayed. Alternatively, both values may be included in the output signals for the display 12.

Various other modifications of the illustrated processor means may include the incorporation of additional control inputs allowing selection of different scales for the display outputs, e.g., altitude in feet or meters, airspeed in knots or mach number, etc. It will be appreciated that implementation of additional control inputs may best be accommodated by the use of a random access memory, communicating, like program memory 42, over program bus 36, for storing scaling factors and other reprogrammable components of the sample period algorithm.

It will furthermore be realized that control input 65 and any additional control inputs may each include a corresponding input register or other peripheral interface device similar to registers 34 and 38. It may also be desirable, as an alternative to the input multiplexing and output demultiplexing arrangement shown, to employ a dedicated, memory-mapped peripheral interface register for each sensor input and display output, allowing input and output sequencing to be controlled by the microprocessor 44. Each such additional input register would have a tri-state output, as at 68, under microprocessor control.

In the illustrated embodiment, the updated display outputs are sequentially loaded into output register 38 and applied in multiplexed format to output bus 40. In accordance with the predetermined output sequence, then, demultiplexer 46 routes the outputs to display signals 70 corresponding to the inputs to display 12.

Absent a failure of the aircraft electrical supply systems, power for the sensor, processor and display means, as well as for charging standby battery 52, is derived from the first voltage regulator 50 having a connection 74 to the aircraft electrical system or other primary external power source. Upon a power failure, battery 52 begins supplying power to the second voltage regulator 54. Battery 52 should have sufficient storage capacity to supply power for several hours, providing sufficient time for a safe landing in the event of instrument failure. Thus, regulator 54 continuously derives appropriate supply voltages, indicated by broken lines 76–79, for the pressure transducers, angular rate sensors, processor means, and display, respectively.

In view of the numerous possible modifications discussed above and other variations of the present invention which may suggest themselves to those skilled in the art, the scope of the invention is to be interpretted only by the claims which follow.

What is claimed is:

1. A single unit standby flight instrument for displaying turn rate, altitude, airspeed, pitch, roll, and heading of an aircraft to a pilot of the aircraft, said aircraft having an instrument panel with manual flight instrumentation, said instrument comprising sensor means for generating a plurality of sensor signals indicative of pitot pressure, static pressure, and angular displacement rates of the aircraft;

display means for outputting display signals in a desired format;

processor means for converting the sensor signals into a purality of display signals indicative of the turn rate, altitude, airspeed, pitch, roll and heading of the aircraft, said processor means comprising sampling means for periodically sampling said sensor signals, converter means for digitizing the sampled sensor signals, multiplexing means for applying the digitized sensor signals to an input bus in a predetermined input sequence, an input register responsive to the input bus and having a tri-state output for applying said digitized sensor signals to a program bus, an output register responsive to the program bus for outputting said display signals in a multiplexed format according to a predetermined output sequence, a microprocessor for controlling data flow on the program bus and updating the output register in accordance with current values of said digitized sensor signals in the input register, and demultiplexed means responsive to said output register for routing said display signals in accordance with the predetermined output sequence to appropriate inputs of said display means;

power supply means for supplying electric power to said sensor means, processor means, and display means; and a single instrument housing mounted within view of the pilot and enclosing said sensor means, processor means, and power supply means, said display means being mounted on said housing so as to be visible to the pilot, said housing being rigidly mounted to the aircraft and located in an area on the instrument panel close to the standard flight instrumentation and within the vision limits of the pilot, thereby providing said pilot with an emergency source of airspeed, altitude, heading, attitude, and rate of turn information in a single compact unit.

2. The device of claim 1, wherein said sensor means comprises first and second pressure transducer means connnected, respectively, to first and second vents through the housing, the first vent communicating with a pitot tube, the second vent communicating with an unpressurized volume of static air within the aircraft, said first and second pressure transducer means generating, respectively, the pitot pressure and static pressure sensor signals; and at least three angular rate sensors, each generating one of the angular displacement rate sensor signals, said sensors being rigidly mounted within the housing in a non-planar orientation such that the pitch, roll, and heading of the aircraft at a given time may be computed by continuously monitoring the angular displacement rate sensor signals.

3. The device of claim 1, wherein said display means comprises a liquid crystal display.

4. The device of claim 1, wherein said sensor means, processor means and display means are electrically powered electronic components and said power supply means comprises a battery, first voltage regulator means for charging said battery from an electrical system in the aircraft, and second voltage regulator means responsive to said battery for deriving supply voltage to said sensor means, said processor means and said display means upon failure of said electrical system.

* * * * *

UNITED STATES PATENT AND TRADEMARK OFFICE
CERTIFICATE OF CORRECTION

PATENT NO. : 4,598,292

DATED : July 1, 1986

INVENTOR(S) : VINCENT A. DEVINO

It is certified that error appears in the above-identified patent and that said Letters Patent is hereby corrected as shown below:

Col. 2, line 51, a comma should be inserted after "aircraft"
line 58, "axes ———" should be -- axes --

Col. 6, line 21, which is claim 4, "supply voltage" should be -- appropriate supply voltages --

Signed and Sealed this

Eighth Day of September, 1987

*Attest:*

DONALD J. QUIGG

*Attesting Officer*     *Commissioner of Patents and Trademarks*